(12) United States Patent
Rino

(10) Patent No.: US 6,276,422 B1
(45) Date of Patent: Aug. 21, 2001

(54) DEVICE FOR FACILITATING TIRE FITTING AND REMOVAL

(75) Inventor: Spaggiari Rino, Correggio (IT)

(73) Assignee: G. S. S.r.l., Correggio (IT)

( * ) Notice: Subject to any disclaimer, the term of this patent is extended or adjusted under 35 U.S.C. 154(b) by 0 days.

(21) Appl. No.: 09/427,673

(22) Filed: Oct. 27, 1999

(30) Foreign Application Priority Data

Mar. 31, 1999 (IT) .............................................. MO99A0059

(51) Int. Cl.[7] .................................................. B60C 25/132
(52) U.S. Cl. ....................................... 157/1.17; 157/1.28
(58) Field of Search ................................... 157/1.17, 1.2, 157/1.22, 1.24, 1.26, 1.28, 1, 1.1

(56) References Cited

U.S. PATENT DOCUMENTS

| | | | |
|---|---|---|---|
| 3,042,090 | * 7/1962 | Foster | 157/1.28 X |
| 3,180,392 | * 4/1965 | Foster | 157/1.28 |
| 3,827,475 | * 8/1974 | Brosene, Jr. | 157/128 |
| 6,065,522 | * 5/2000 | Spaggiari | 157/1.1 |

* cited by examiner

*Primary Examiner*—D. S. Meislin
(74) *Attorney, Agent, or Firm*—Browdy and Neimark

(57) ABSTRACT

The device is used for facilitating a tire fitting and is usable in combination with a self-centering platform, rotatable about an axis, and with a fitting tool. The device is constituted by an auxiliary tool provided with a frame and having a lower free end which is removably constrainable to the self-centering platform. The frame comprises a support which, when the free end is constrained to the platform, is vertical, lateral and external of the wheel. A pusher element is connected to the support and can move in a parallel direction to a longitudinal axis of the support. The pusher element interacts contactingly with a tire wall situated facing upwards and forces an upper bead to remain below an upper edge of the rim during rotation of the self-centering platform in order to achieve tire fitting.

2 Claims, 2 Drawing Sheets

DEVICE FOR FACILITATING TIRE FITTING AND REMOVAL

BACKGROUND OF THE INVENTION

The invention especially relates to a device which can be used together with a self-centering platform and a fitting tool. The platform is rotatable about preferably vertical a rotation axis. A vehicle wheel rim can be fitted, gripped and centered on the platform, together with a tire to be fitted onto the rim.

Before mounting, the upper bead of the tire is placed above the upper edge of the wheel rim; the fitting tool is positionable above the upper bead and can push the bead beneath the upper edge of the rim; during tire fitting the fitting tool acts on at least a part of the circumference of the upper bead (being the bead situated uppermost when the tire is loaded on the platform) of the tire by effect of a rotation of the platform; the device comprises an auxiliary tool which during operation can be associated to a part of the upper bead in order to force that part of the upper bead to remain beneath the upper edge of the rim during the rotation of the platform to carry out the tire mounting.

A device of this type is already known, in which the auxiliary tool comprises a clamp which is couplable to the upper edge of the wheel rim and which is equipped with a screw-locking element destined to interact contactingly with the upper bead. However, a clamp destined to be coupled on the rim of a certain type of wheel is not usually suitable for use with another type of wheel.

Consequently, in order to mount tires on many different types and models of wheels, a considerable number of clamp devices are needed, each having a clamp which is suitable for coupling with each type of wheel.

SUMMARY OF THE INVENTION

The main aim of the present invention is to provide a universal device for use with every type of wheel.

An advantage of the invention is that it provides a device by means of which tire fitting can be achieved very quickly and efficiently.

Another advantage of the invention is its simplicity of use.

A further advantage is that it prevents any relative sliding between the tire and parts of the device during the mounting operation.

The invention enables a good fitting and effective settling of the tire beads in the housings in the rim with only a contained exertion of force.

These aims and advantages and more besides are all achieved by the invention of the object, as it is characterised in the accompanying claims.

BRIEF DESCRIPTION OF THE DRAWINGS

Further characteristics and advantages of the present invention will better emerge from the detailed description which follows, of a preferred form of embodiment of the invention, illustrated purely by way of non-limiting example in the accompanying figures of the drawings, in which.

DESCRIPTION OF THE PREFERRED EMBODIMENTS

Figure 1:
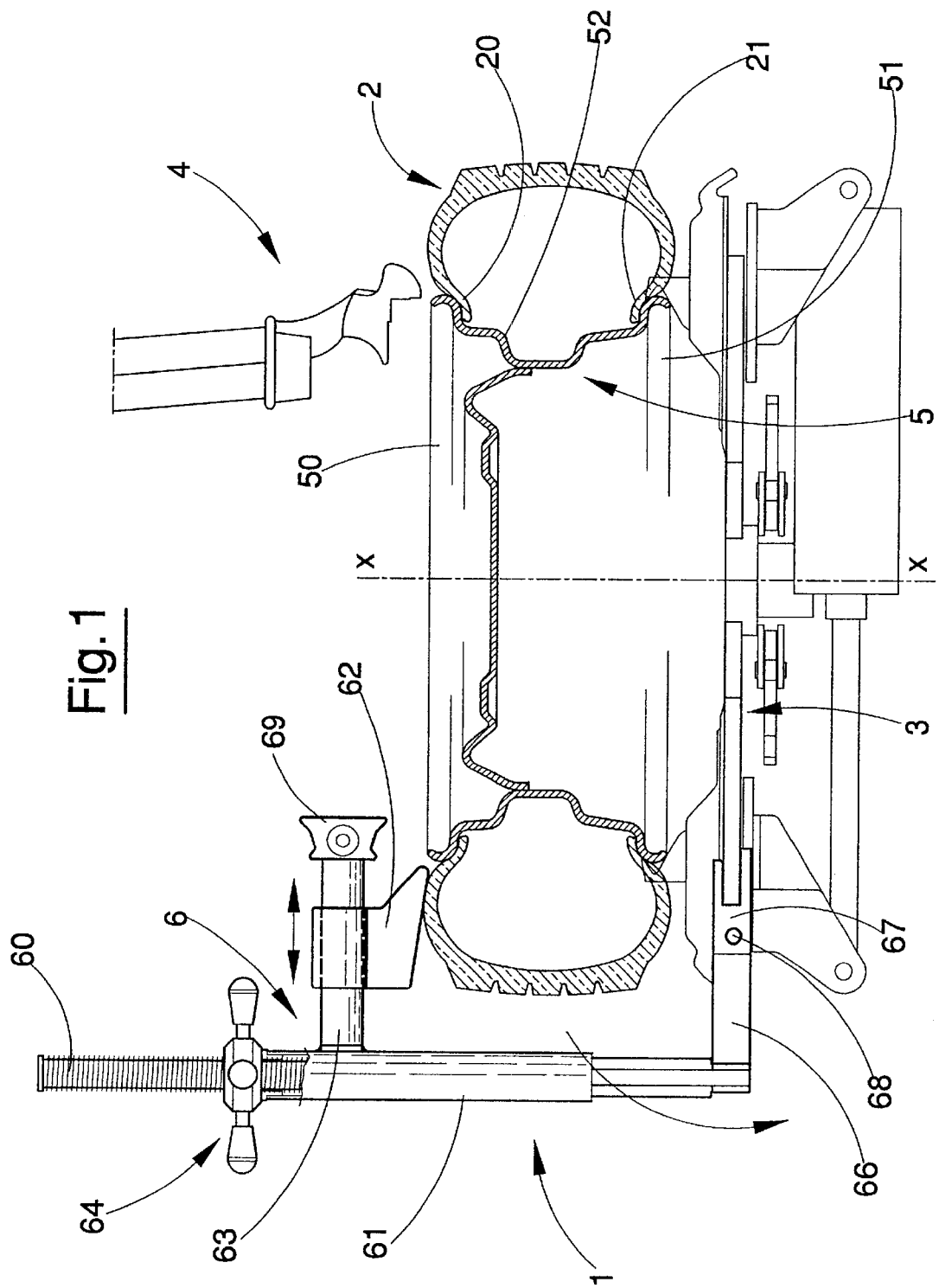
FIG. 1 is a partially-sectioned schematic lateral view in vertical elevation of an embodiment of the invention, in a first operational configuration.

With reference to the above-mentioned figures of the drawings, 1 denotes in its entirety a device for facilitating a fitting of a tire 2. The device 1 can be used in combination with a self-centering platform 3 and with a fitting tool 4.

The platform 3, of known type, is rotatable about a vertical rotation axis x—x.

A rim 5 of a wheel bearing a tire 2 to be fitted thereon can be positioned, centered and gripped on the platform 3. The rim 5 of the wheel has two circular edges, one upper 50 and the other lower 51 (with respect to the lie plane of the rim 5 on the platform), and a lateral channel 52 affording seatings in which an upper bead 20 and a lower bead 21 (again, with respect to the lie plane of the tire 2 on the platform) of the tire 2 can be fitted.

Before fitting the lower bead 21 is located in the lateral channel 52 of the rim 5, while the upper bead 20 of the tire 2 is located externally of the channel 52 and above the upper edge 50 of the rim 5.

The fitting tool 4, of known type, can be positioned above the upper bead 20 in order to push it below the upper edge 50 of the rim 5. During the tire fitting operation the fitting tool 4 acts on at least a part of the circumference of the upper bead 20 of the tire by effect of a rotation of the platform 3.

The device 1 essentially comprises an auxiliary tool 6 which can be associated with a zone of the upper side of the tire in order to force said zone and especially the upper bead 20 zone to fit and stay below the upper edge 50 of the rim 5 during rotation of the platform 3 in order to complete the tire fitting. This auxiliary tool 6 comprises a frame 60 which is constituted by a threaded rod predisposed in such a way as to be constrainable at a lower end thereof to the self-centering platform 3.

A horizontal rod 66 is solidly fixed to a lower end of the frame 60; the rod 66 bears at a free end thereof an interconnecting element 67 which can be joint-coupled to an edge of the self-centering platform. The element 67 is constrained to the rod 66 in such a way as to be free to oscillate about a pivot 68, with a horizontal rotation axis. This articulation is intended to enable the tool 6 to be adaptable to the various different sizes of the rims 5 which will be mounted on the platform 3. The frame 60 is specially sized so that when the element 67 is coupled to the edge of the self-centering platform 3 the frame 60 is located externally of the wheel and extends vertically, projecting above the wheel.

A support sleeve 61 is slidably coupled on the frame 60. This sleeve 61 is axially slidable along a threaded rod which is a part of the frame 60. The threaded rod bears a radial support arm 63, on which a pusher element 62 is freely slidably coupled; this pusher element 62 will interact contactingly with the upper wall of the tire 2.

The arm 63 is provided with a free end 69 which is predisposed to be pressed into contact with the upper edge 50 of the rim 5 gripped on the self-centering platform 3.

A screw locking member 64 is provided, which acts on the sleeve support 61 and thus on the arm 63, pressing the free end 69 of the arm against the edge 50 of the rim 5 and fixing the whole device 1 to the assembly constituted by the platform 3 and the rim 5. This configuration forces the pusher element 62 into a position in which it locks the upper tire wall and relative bead 20 below the rim edge 50.

The tire 2 is fitted as hereinafter described. The wheel is fixed on the platform 3. The tire 2 on the wheel must be coupled to the rim 5 starting from a configuration in which the lower bead is internal of the lateral channel 52 and the rim 5 and the upper bead 20 is external of the lateral channel 52, above the upper edge of the rim 5. The fitting tool 4 is lowered (by control means of known type) and pushes a part of the upper bead 50 internally of the lateral channel 52 below the upper edge 50 of the rim 5. During this phase, only a small area of the upper bead 50 is pushed into the lateral channel 52 of the rim 5, while the greater part of the circumference of the upper bead 50 remains outside the lateral channel 52 and above the upper edge 50.

Then the auxiliary tool 6 is applied at the zone of the bead inserted in the lateral channel 52. The tool 6 is used to couple the joint element 67 to the edge of the self-centering platform 3, and then the screw locking member 64 is rotated so as to displace the sleeve support 61 and consequently the pusher element 62 downwards.

The locking member 64 presses the support arm 63 so that the end 69 of the arm 63 is pressed against the edge 50 of the rim 5 so as to fix the frame 60 and therefore the whole device 1 to the assembly constituted by the platform 3 and the rim 5, forcing the pusher element 62 to keep the upper wall of the tire 2 and the bead 20 pressed below the rim 5. In this configuration, the coupling of the joint element 67 to the edge of the self-centering platform 3 creates a simple and safe lock since, by effect of the forces in play, the element is subject to a torque which tends to produce a rotation thereof about an axis which is tangential to the self-centering platform 3.

Thus a configuration is reached in which the fitting tool and the auxiliary tool cooperate, one by the side of the other and at short distance one from the other, to constrain a relatively small part of the wall and thus of the upper bead 20 to stay within the lateral channel 52 in the mounting position. The remaining part of the tire 2 stays for now outside the channel 52; in particular, the part of the tire 2 which is diametrically opposite the part which has already been coupled to the rim 5 is decidedly raised above the upper edge of the rim 5. At this point the platform 3 is commanded to rotate. By effect of the rotation the auxiliary tool 6 rotates together with the platform 3, while the fitting tool 4, which does not rotate, can interact with the circumference of the upper bead 20 to force the bead into the lateral channel 52 of the rim 5. During this phase the auxiliary tool 6 has the task of preventing the parts of the bead 20 distanced from the fitting tool 4 during the rotation from disengaging from the rim 5, exiting from the channel 52.

The auxiliary tool 6 functions as a contrast element opposing the force which during the rotation of the platform 3 would tend to eject the part of the tire 2 furthest from the fitting tool from its seating in the channel 52 of the rim 5.

During rotation the pusher element 62 is in contact with the part of the upper wall whose bead 20 had previously been forced to enter below the upper edge of the rim 5 and had been inserted into the lateral channel 52 before the start of the rotation. This pusher element 62, in cooperation with the frame on which it is mounted (which frame is inferiorly connected to the platform 3), functions as a contrast element preventing the raising of the above-mentioned part of the bead, holding it in position. When the platform 3 has rotated by a little less than a full revolution, the fitting tool 4 is once more side-by-side with and at a short distance from the auxiliary tool 6 (but on the opposite side from the position at the beginning of the rotation), and the insertion of the tire 2 in the channel 52 is complete.

Figure 2:
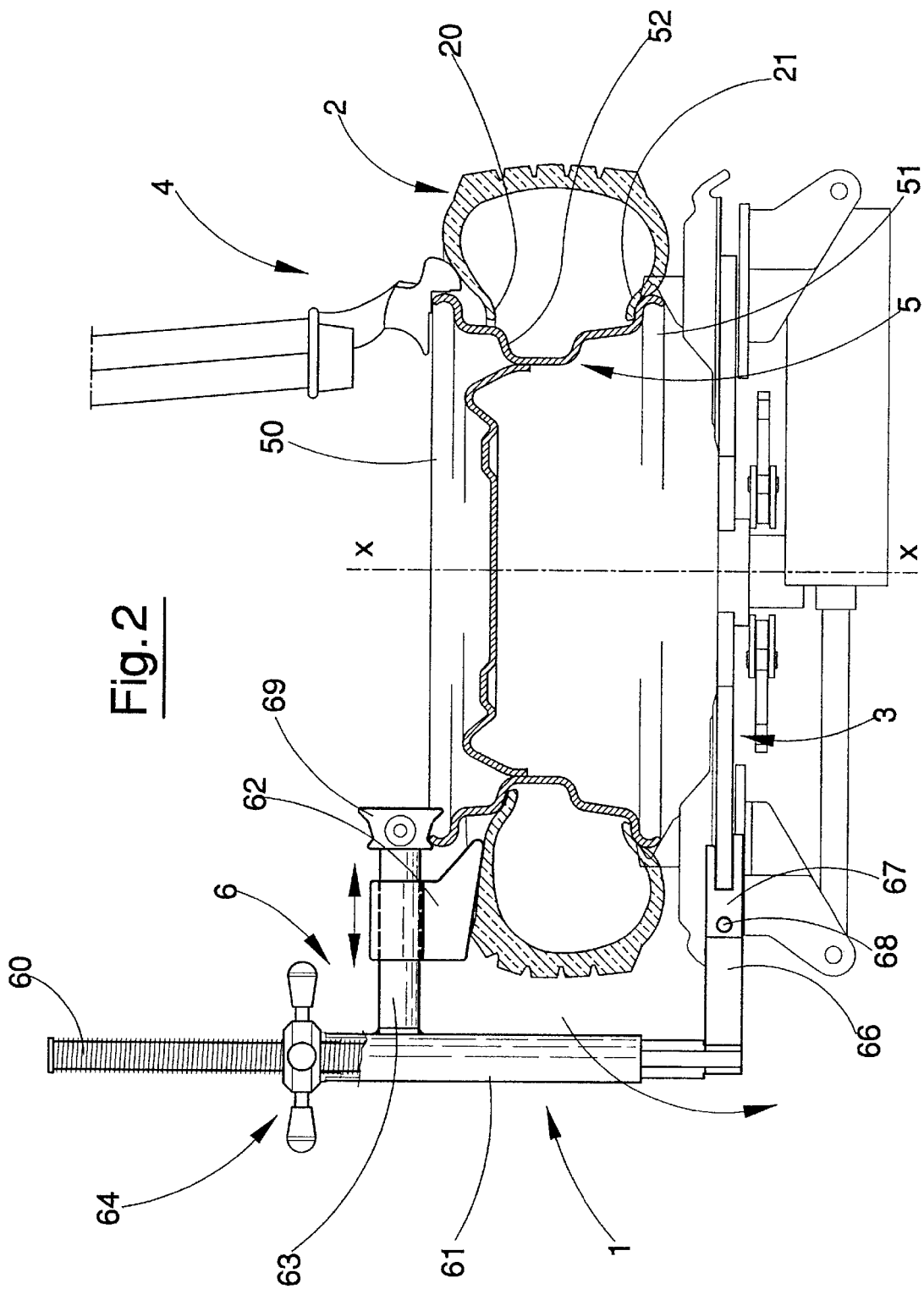
FIG. 2 shows the invention of FIG. 1 in a different operational configuration.

It should be observed that, during the rotation of the platform 3, the part of the tire 2 in contact with the pusher and contrast element is subject to radial displacements with respect to the rim 5 and that consequently the pusher element slides on the arm carrying it, following these radial displacements, solidly with the above-mentioned part of the bead which it is in contact with, and drawn thereby. FIGS. 1 and 2 evidence the radial displacement of the upper bead and the pusher element. The ability of the pusher element 62 to move along the arm 63 means that there is no drag of the pusher element on the tire wall it is in contact with.

What is claimed is:

1. A device for facilitating the fitting of a tire on a rim of a wheel with an upper bead on an upper wall positioned above an upper edge of the rim;

the device comprising:

a self-centering platform rotatable about a vertical axis of rotation and adapted to coaxially secure the rim of the wheel;

a fitting tool positioned above the self-centering platform and the tire to be fitted;

an auxiliary tool having a frame with a horizontal rod fastened to a lower end thereof;

a support sleeve slidably engaged on the frame having a support arm;

a pusher element slidably engaged on the support arm;

a locking member engaged on the frame above the support sleeve adapted to press the support sleeve and the pusher element on the support arm into engagement with the upper wall and engage the upper bead of the tire to be fitted under the upper edge of the rim; and an interconnecting element having a first end rotatably engaged to the horizontal rod and a second slotted end engaged over an edge of the self-centering platform;

wherein, when the fitting tool pushes the upper bead of the tire below the upper edge of the rim and the support sleeve presses the pusher to engage the upper bead under the upper edge of the rim, the self centering platform can be rotated to fit the upper bead completely under the upper edge of the rim.

2. The device of claim 1, wherein the frame is constituted at least in part by a threaded rod and the locking member is in the form of a screw-nut screw-coupled on the threaded rod.

* * * * *